United States Patent [19]

McCauley et al.

[11] Patent Number: 6,117,813
[45] Date of Patent: Sep. 12, 2000

[54] CATALYST AND PROCESS FOR PREPARING AND USING SAME

[75] Inventors: John R. McCauley, Louisville; J. Gary McDaniel, Bel Air, both of Md.

[73] Assignee: Tricat Industries, Inc., Baltimore, Md.

[21] Appl. No.: 08/874,635

[22] Filed: Jun. 13, 1997

Related U.S. Application Data

[63] Continuation-in-part of application No. 08/432,996, May 2, 1995, abandoned.

[51] Int. Cl.⁷ ............................. B01J 23/02; B01J 23/10; B01J 23/76
[52] U.S. Cl. ..................... 502/303; 502/302; 502/328; 502/340
[58] Field of Search .................................. 502/302, 303, 502/328, 340

[56] References Cited

U.S. PATENT DOCUMENTS

| | | | |
|---|---|---|---|
| 3,897,367 | 7/1975 | Lauder | 502/303 |
| 4,485,191 | 11/1984 | Sekido et al. | 502/303 |
| 4,988,660 | 1/1991 | Campbell | 502/303 |
| 5,102,850 | 4/1992 | Sanchez et al. | 502/261 |
| 5,242,881 | 9/1993 | Tang et al. | 502/244 |

OTHER PUBLICATIONS

Grant & Hackh's Chemical Dictionary, 5th Edition, McGraw Hill, p 547, 1987.
Grant & Hackh's Chemical Dictionary, Fifth Edition, Grant et al, pp. 140 and 321, 1987.

*Primary Examiner*—John F. Niebling
*Assistant Examiner*—Alexander G. Ghyka
*Attorney, Agent, or Firm*—McDermott, Will & Emery

[57] ABSTRACT

The invention is a catalyst composition and process for making and using the catalyst composition. The catalyst composition promotes the combustion of carbon monoxide to carbon dioxide. The catalyst composition includes an effective concentration of Group VIII transition metal oxide, an effective concentration of Group IIIB transition metal oxide, an effective concentration of Group IIA alkaline earth metal oxide, and, desirably, microspheroidal alumina. The preferred Group VIII transition metal oxide is cobalt oxide. The preferred Group IIIB transition metal oxide is lanthanum oxide. The preferred Group IIA alkaline earth metal is strontium oxide. The process is for producing a combustion promotor catalyst of carbon monoxide to carbon dioxide. The carrier for the catalyst is effective in FCC units when used on a support which is other than a mullite-containing support.

17 Claims, No Drawings

CATALYST AND PROCESS FOR PREPARING AND USING SAME

This is a continuation-in-part application U.S. Ser. No. 08/432,996, filed May 2, 1995, now abandoned.

TECHNICAL FIELD

This invention relates to a cracking catalyst additive and process for preparing the cracking catalyst additive. Particularly, this invention relates to a fluid cracking catalyst additive ("FCC additive") for promoting the combustion of carbon monoxide to carbon dioxide in the regeneration of a fluid cracking catalyst.

BACKGROUND ART

Catalyst manufacturers are continuously seeking catalysts, additives, and processes to improve the properties of catalysts and additives to lower the cost of producing catalysts and additives. Catalyst and additive producers, typically, search for materials, equipment, or processes that decrease the cost of raw materials or utilities, or increase the efficiency of the catalyst process with increased feed through-put, lower equipment maintenance, or improved utilization of raw materials. All these factors contribute to the manufacturing costs of catalysts and additives.

The use of transition metals in specific fluid cracking catalyst formulations can improve the selectivity of a given fluid cracking catalyst unit, using a specific gas oil feed, but results in undesired concentrations of coke and yields of light gas. The undesirable loss of gasoline yield and increases in coke and light gases with transition metal formulations diminishes the value of the enhanced production of desirable products such as olefins.

Rare earth complex oxide combustion catalysts have been proposed in U.S. Pat. No. 5,242,881 to Tang et al. In this patent, perovskite-type rare earth complex oxide active components are carried on a support using mullite as the main phase. In the prior art section of the Tang et al. patent, the use of perovskite-type rare earth complex oxides as active components of a catalyst have attracted wide attention due to their catalytic oxidizing function for carbon monoxide and hydrocarbons. The Tang et al. patent further states that catalysts using perovskite-type complex oxides as the active components are generally carried on γ-$AL_2O_3$. These supports are noted to envitably react chemically with the complex oxide. As a result, aluminum-containing perovskite or aluminum-containing spinel with non-catalytic activity is formed, causing part of the active components to be damaged, so that the activity of the catalysts dropped universally. Attempts have been made to solve the problem by precoating or using the active components as catalysts alone without support. The Tang et al. patent solves these problems by using a support with mullite as a main phase for a perovskite-type active component having the following general formula:

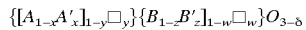

wherein A represents a rear earth metal element, preferably La, Ce or mixed rare earths and most preferably, La or Ce; A' represents an alkaline earth metal element, preferably Ca, Sr or Ba and most preferably Ca or Sr, □ represents the vacancy in the structure; B and B' represent the transition metal elements, preferably Ti, Cr, Co, Mn, Cu, Fe or Ni, and most preferably Ti, Cr, Co or Mn; $0 \leq x \leq 0.9$; $0 \leq y \leq 0.2$; $0 \leq z \leq 0.9$; $0 \leq w \leq 0.05$; $0 \leq \delta \leq 0.8$. And a support with mullite as the main phase, wherein the said active components are carried directly on the said support.

U.S. Pat. No. 3,897,367 to Lauder discloses metal oxide catalytic compounds which are also of the perovskite-type $ABO_3$ structure wherein 1–20% of the B site cations are ruthenium or platinum. The composition of the Lauder patent is an improvement over rare earth cobaltite catalytic compositions.

The present invention is an improvement over both the Tang et al. and Lauder patents.

The catalytic additive of the invention does not require mullite nor a noble metal for catalyzing the conversion of carbon monoxide to carbon dioxide in the regenerator of an FCC unit. The inventive catalytic additive is less expensive to produce and results in an additive with the same efficiency as a noble metal additive in converting the carbon monoxide into carbon dioxide. The combination of elements on a support which does not have mullite as its main phase, e.g., an alumina microsphere, is a very effective "combustion promoter" additive, effectively reducing NOX emissions.

DISCLOSURE OF THE INVENTION

The invention is a catalyst composition. The composition includes at least one Group VIII transition metal, at least one Group IIIB transition metal, and at least one Group IIA alkaline earth metal.

The invention is also a process for producing a combustion promotor catalyst of carbon monoxide to carbon dioxide. The process includes the following steps. Mixing aqueous solutions of effective concentrations of at least one Group VIII transition metal, at least one Group IIIB transition metal, and at least one Group IIA alkaline earth metal is performed. Then, the mixed, aqueous solutions are injected under pressure onto a support not having mullite as its main phase, e.g., a microspheroidal alumina powder, to impregnate the microspheroidal alumina powder. The impregnated microspheroidal alumina powder is then dried.

Using the catalyst composition described above, it has been discovered that the non-noble metal containing catalyst composition when used on a support other than one having mullite as its main phase is a very effective combustion promoter additive.

The invention also includes the use of the catalyst.

BEST MODE FOR CARRYING OUT THE INVENTION

The invention is a catalyst composition and its use in an FCC unit. The composition includes at least one Group VIII transition metal, at least one Group IIIB transition metal, and at least one Group IIA alkaline earth metal. The catalyst composition promotes the combustion of carbon monoxide to carbon dioxide.

A combination of metals, including two transition metals, is used in the catalyst composition. The two transition metals include one transition metal from Group VIII of the Periodic Table, such as cobalt, and one transition metal from Group IIIB of the Periodic Table, such as lanthanum. A third metal from the alkaline earth Group IIA of the Periodic Table, such as strontium, is also used. The combination of metals provides a very effective catalyst that does not produce undesirably high concentrations of coke and/or light gas. Other desirable combinations of elements from each of these groups include magnesium, calcium, or barium in combination with any of the other Group IIIB transition metals, such as scandium or yttrium, and combined with other members of the Group VIII transition metals.

The catalyst composition includes an effective concentration of Group VIII transition metal oxide, an effective concentration of Group IIIB transition metal oxide, an effective concentration of Group IIA alkaline earth metal oxide, and a non-mullite support, desirably a microspheroidal alumina. The preferred Group VIII transition metal oxide has a metal being a member selected from the group consisting of cobalt, nickel, iron, ruthenium, rhodium, palladium, osmium, iridium, platinum, and mixtures of these. The preferred Group IIIB transition metal oxide has a metal being a member selected from the group consisting of lanthanum, scandium, yttrium, and mixtures of these. The preferred Group IIA alkaline earth metal has a metal being a member selected from the group consisting of strontium, magnesium, calcium, barium, and mixtures of these. Ratios of the concentration of one metal can be selected to reduce the concentration of another selected metal. The catalyst composition does not require a noble metal such as platinum or ruthenium.

The invention includes the composition described above on a support which does not have mullite as its main phase. This support can be microspheroidal alumina powder or carriers such as zeolites (both natural and/or synthetic), metallosilicates, crystalline silicoaluminum phosphates ("SAPO"), crystalline aluminum phosphates ("ALPO"), crystalline metallaluminum phosphates ("MAPO"), alumina, titania, zirconia, silica-aluminas, spinels, e.g., magnesium aluminate spinels, clays, e.g., palygorskites, smectites, kaolins and chlorites, hydrotalcites, ceramic materials, equilibrium or spent FCC catalysts ("E-cat"), and other inorganic oxide and oxide combinations. These supports can be used "as is" or they can be used after being enhanced or modified by acid and/or alkali leaching or ion-exchange procedures, by heat treatment such as calcination, or by impregnation with performance enhancers. It has been found particularly suitable to employ silica-aluminas, an E-cat, spinels, such as magnesium aluminate spinels, and clays, such as palygorskites, smectites, kaolins and chlorites as catalyst supports in accordance with the present invention.

The supports described above should also possess specific physical properties as a support for a fluid catalytic cracking (FCC) additive. These properties are as follows: a microspheroidal shape is preferred—the product must be easily fluidizable; an average particle size (APS) of 50–350 microns is desired with 65–85 micron being typical; the support should have a high degree of thermal stability (the particles see temperatures up to 1400° F., as such, organic materials are not suitable because they are combusted at lower temperatures); a hard particle is required, hardness is essential due to the tough abrasive environment of the FCC unit. The hardness is measured as the "Attrition Index" of the material. Using a Davidson Index (DI) measurement as developed by Grace-Davidson, a DI of less than 30 is preferred and less than 10 is optimal. The catalyst surface area should range between 20–600 $m^2/g$ to have a "surface" for impregnation of the active metals. Typical surface areas range from 80–250 $m^2/g$.

The invention is also a process for producing a combustion promotor catalyst of carbon monoxide to carbon dioxide. The process includes the following steps. Mixing of aqueous solutions of effective concentrations of at least one Group VIII transition metal, at least one Group IIIB transition metal, and at least one Group IIA alkaline earth metal is performed. Injecting the mixed, aqueous solutions under pressure into microspheroidal alumina powder to impregnate the microspheroidal alumina powder. Drying the impregnated microspheroidal alumina powder is then performed For example, an aqueous solution of cobalt oxide, lanthanum oxide and strontium oxide can be formed, injected into microspheroidal alumina and dried. The present invention includes the use of at least one Group VIII metal excluding the noble metal.

The following example depicts the process for producing the preferred catalyst composition of the invention.

EXAMPLES

This example produces a preferred embodiment of the catalyst composition. The preferred embodiment of the catalyst composition has the active components and concentrations of Table 1.

TABLE 1

3.0% CoO
0.8% SrO
4.6% $La_2O_3$

The catalyst composition of this example is made by mixing aqueous solutions of the compounds of Table 2.

TABLE 2

| | |
|---|---|
| Strontium Chloride ($SrCl_2$) | 53.4% Sr |
| Cobalt Chloride ($CoCl_2$) | 44.6% Co |
| Lanthanum solution | 59.0% $La_2O_3$/REO |
| Water | |

The desired aqueous solutions can be made on a "laboratory scale" by dissolving 127.0 grams of $SrCl_2$ powder in 240 grams of deionized water and 523.3 grams of $CoCl_2$ powder in 989 grams of deionized water. then, 1856 grams of $La_2O_3$/REO solution is measured. Next, 22 pounds of the alumina powder is placed in a mixer. The three solutions are added to a liquid delivery device. The mixer is started allowing the powder to tumble. The liquid delivery device is pressurized and the liquid is sprayed onto the tumbling powder. The impregnated material is then oven dried to reduce the moisture content to less than 10%. The material is then ready for packaging and shipment.

The catalyst composition of this example can be added to catalysts or applied to radiators of automobiles to filter air. Alternatively, the catalyst composition can be added to the regenerator of a fluid catalytic cracking unit to convert carbon monoxide to carbondioxide.

What is claimed is:

1. A method for producing a combustion promoter catalyst to convert carbon monoxide to carbon dioxide during a fluid catalytic cracking regeneration, which method comprises:

mixing aqueous solutions of effective concentrations of:
      at least one Group VIII transition metal selected from the group of iron, cobalt and nickel;
      at least one Group IIIB transition metal; and
      at least one Group IIA alkaline earth metal;
   injecting said mixed, aqueous solutions under pressure onto a support consisting essentially of a non-mullite carrier to impregnate said non-mullite carrier with the aqueous solutions; and
   drying said impregnated carrier to form said catalyst.

2. The method according to claim 1, wherein said Group VIII transition metal is cobalt.

3. The method according to claim 1, wherein said Group IIIB transition metal is a member selected from the group consisting of lanthanum, scandium, yttrium and mixtures thereof.

4. The method according to claim 1, wherein said Group IIA alkaline earth metal is a member selected from the group consisting of strontium, magnesium, calcium, barium and mixtures thereof.

5. The method according to claim 2, wherein said Group VIII transition metal is cobalt in cobalt oxide form, said Group IIIB transition metal is lanthanum in lanthanum oxide form and said Group IIA alkaline earth metal is strontium in strontium oxide form.

6. A method for producing a combustion promoter catalyst to convert carbon monoxide to carbon dioxide during a fluid catalytic cracking regeneration, which method comprises:

mixing aqueous solutions of effective concentrations of:
at least one Group VIII transition metal;
at least one Group IIIB transition metal; and
at least one Group IIA alkaline earth metal;
injecting the mixed aqueous solutions under pressure onto a support consisting essentially of a non-mullite carrier to impregnate the non-mullite carrier with the aqueous solutions; and
drying said impregnated carrier to form said catalyst.

7. The method according to claim 6, wherein the Group VIII transition metal comprises a member selected from the group consisting of iron, cobalt, nickel and mixtures thereof.

8. The method according to claim 6, wherein the Group IIIB transition metal is a member selected from the group consisting of lanthanum, scandium, yttrium and mixtures thereof.

9. The method according to claim 6, wherein the Group IIA alkaline earth metal is a member selected from the group consisting of strontium, magnesium, calcium, barium and mixtures thereof.

10. The method according to claim 1, wherein the support consists of a non-mullite carrier.

11. The method according to claim 6, wherein the support consists of a non-mullite carrier.

12. A catalyst comprising:
(a) a catalyst composition consisting essentially of: an effective concentration in weight percent, based on the total catalyst dry weight, of cobalt oxide, lanthanum oxide and strontium oxide of 3.9, 4.6 and 0.8 respectively; and
(b) a non-mullite containing carrier having said catalyst composition on a surface thereof.

13. A catalyst comprising:
a) a catalyst composition consisting essentially of:
at least one Group VIII transition metal selected from the group consisting of iron, nickel and cobalt;
at least one Group IIIB transition metal;
at least one Group IIA alkaline earth metal; and
b) a carrier comprising an equilibrium or spent FCC catalyst having said catalyst composition on a surface thereof.

14. The catalyst according to claim 12, wherein the non-mullite carrier comprises a clay.

15. The catalyst according to claim 14, wherein the clay comprises a palygorskite, smectite, kaolin or chlorite.

16. The catalyst according to claim 12, wherein the non-mullite carrier comprises a silica-alumina.

17. The catalyst according to claim 12, wherein the non-mullite carrier comprises a spinel.

* * * * *